United States Patent [19]
Verhagen et al.

[11] 3,851,137
[45] Nov. 26, 1974

[54] WELDING APPARATUS WITH CONSUMABLE WELDING WIRE

[75] Inventors: Johannes Gerardus Verhagen, Emmasingel, Eindhoven, Netherlands; Edmond Joannes Josef Dekeyser, Bierges Lez Wavre, Belgium; Jan Cyrille Martin Claes; Gerardus Antonius Maria Willems, both of Emmasingel, Eindhoven, Netherlands

[73] Assignee: U.S. Philips Corporation, New York, N.Y.

[22] Filed: Apr. 23, 1973

[21] Appl. No.: 353,883

[30] Foreign Application Priority Data
May 17, 1972 Netherlands........................ 7206615

[52] U.S. Cl............................... 219/131 F, 219/130
[51] Int. Cl.............................................. B23k 9/10
[58] Field of Search ............. 219/131 F, 131 R, 130, 219/13 F, 132

[56] References Cited
UNITED STATES PATENTS

| | | | |
|---|---|---|---|
| 3,236,997 | 2/1966 | Johnson et al..................... | 219/130 |
| 3,477,005 | 11/1969 | Weems............................ | 219/132 X |
| 3,538,299 | 11/1970 | Daggett......................... | 219/131 FX |
| 3,538,376 | 11/1970 | Parker.......................... | 219/131 R X |
| 3,581,050 | 5/1971 | Brown et al. ....................... | 219/130 |
| 3,581,051 | 5/1971 | Brown............................ | 219/132 X |
| 3,621,185 | 11/1971 | Iceland et al. ..................... | 219/130 |
| 3,731,049 | 5/1973 | Kiyohara et al................. | 219/131 F |
| 3,737,614 | 6/1973 | Paulange ....................... | 219/131 FX |

*Primary Examiner*—J. V. Truhe
*Assistant Examiner*—G. R. Peterson
*Attorney, Agent, or Firm*—Frank R. Trifari; Bernard Franzblau

[57] ABSTRACT

In welding apparatus employing a consumable welding wire, the wire feed rate and the welding source voltage, as parameters of the required welding energy and for the proper functioning of the welding process, should be precisely adapted to each other if a weld of high quality is to be attained under varying welding conditions. The invention provides a solution for this by measuring the wire feed rate as a parameter and by controlling control devices in the welding circuit by means of this parameter. This considerably simplifies adjustment of the welding equipment, thus enabling remote control, for example, from the welding torch, also during welding. An advantage is that the operator can introduce small, continuous variations of the welding voltage during welding.

10 Claims, 6 Drawing Figures

WELDING APPARATUS WITH CONSUMABLE WELDING WIRE

The invention relates to a welding apparatus using consumable welding wire and comprising an adjustable welding source with electronically controlled control devices in the welding circuit, a wire feed device equipped with a motor driving a consumable welding wire and provided with a wire feed rate meter, and further comprising a program device for adjusting the welding source and the wire feed rate.

From U.S. Pat. No. 3,581,050 it is known to equip a welding apparatus with a program device by means of which various welding conditions can be set or adjusted. The program device contains several prewired program cards which are selected in accordance with certain parameters to obtain a certain welding condition. One of the parameters is the type and the diameter of the consumable wire which is wound onto a reel and attached to the wire feed device prior to welding. Upon mounting the reel a code disk on the reel automatically selects one program card. By means of a switch having at least three positions, corresponding welding voltages and wire feed rates can be selected. As the program cards are pre-wired, only certain voltages can be selected, which are defined by connecting certain taps on the welding transformer via relays and, if desired, in conjunction with a pulse-shaped drive of thyristors in the welding circuit. This also defines a given wire feed rate. In order to stabilize this feed rate a control circuit is used employing the motor speed of the wire feed motor, which is coupled to the reel as a control parameter.

Although in the introduction of said United States Patent it is stated that for obtaining good-quality welds tolerance ranges are permissible, the present welding practice proves that under various conditions a more precise control is necessary, either automatically or by an operator, is which should be adjustable during welding. Owing to the fixed welding voltages combined with certain stabilized wire feed rates the known device cannot comply with all quality standards, for, to achieve this compliance it is necessary that the wire feed rate and welding voltage are accurately related and can be adapted during welding, if necessary.

The invention meets this requirement and to this end it utilises the known means such as electronically controlled control devices in the welding circuit in order to enable a rapid variation of the welding voltage, and a wire feed rate measuring device such as a tachometer on the drive rollers or on the drive motor in order to attain an instantaneous measurement value for the wire feed rate. The control devices may be of the gas-filled type, such as ignitrons or thyratrons, or of the controlled semiconductor type, such as triacs, transistors or thyristors, and may be included before the welding transformer on the primary side or after the welding transformer on the secondary side.

A control unit connected to the respective control electrodes determines whether or not or the extent to which the control devices are conducting as a function of a control signal. The tachometer may be of a type which electronically converts a shaft speed into a voltage via a transducer, as is indicated in FIG. 6 of said United States Patent, or which is constituted by a tacho-generator which is coupled to the motor shaft and supplies a voltage proportional to the speed, or which employs the back-EMF of the motor.

It is an object of the invention to provide a rapidly responding and continuous coupling between welding voltage and wire feed rate, thus enabling adjustment of desired welding conditions in a very simple manner.

To this end a welding apparatus of the type mentioned in the preamble is characterized in that said apparatus comprises a control unit whose output terminals are connected to the electronically controlled control devices and whose first input is connected to the wire feed rate meter for controlling the control devices in accordance with the wire feed rate. The control unit further comprises control elements for obtaining a desired relationship between wire feed rate and welding source voltage. The program device consists of controls which are connected to the wire feed device for adjusting the wire feed rate.

The advantage of such a welding system is that during welding irregularities in the weld are avoided. Should the wire feed rate change, the welding source immediately adapts itself and the welding energy per applied electrode volume remains constant within narrow limits, thus yielding a weld of constant quality. Another advantage is that the adjustment of the welding device is simplified, because it enables the operator to adjust the welding device for example, in accordance with the nature of the workpiece by means of a single control, namely the wire feed control.

This operation can now also be remote-controlled in a simpler manner so that the operator can perform this operation near the workpiece, for example, with a control knob on the welding torch or welding shield or via a pedal.

According to an embodiment of the invention, the control unit which converts the speed signal into a control signal for the control devices may comprise an amplifier whose gain characteristic defines a desired relationship between the wire feed rate and the welding source voltage. By providing this amplifier with control elements, such as potentiometers, the welding-source-voltage versus wire-feed-rate characteristic can, for example, be shifted up or down, which means that a constant voltage value is added or subtracted, while the slope of the characteristic can also be changed with a control element.

In a preferred embodiment the operator is able to change the characteristic during welding by means of remote control, which means that the wire feed remains constant but the welding voltage can be influenced. Thus, the energy with which the weld is made is adjustable without interrupting the welding process, while maintaining control of voltage and wire feed rate.

The invention will now be described in greater detail, by way of example, with reference to the drawings, in which.

Figure 1:
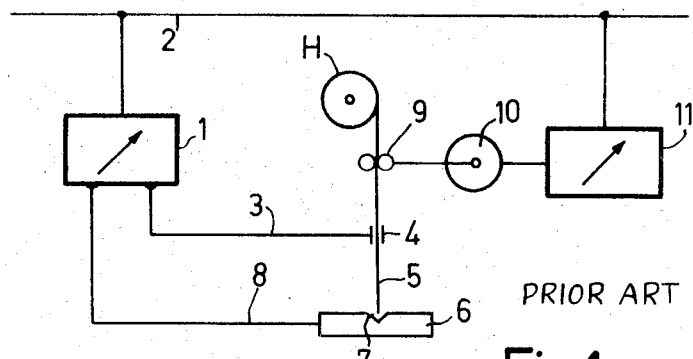
FIG. 1 shows a known welding apparatus in block diagrammatic form.

FIG. 1 shows a known welding apparatus in which a workpiece 6 is being welded with a consumable electrode 5 formed by a consumable wire which is continuously fed from a reel H. The wire will melt off by means of an arc 7 which is maintained by an adjustable welding source 1. The welding current is supplied via a connection 3 and a contact guide 4 to the wire 5 and through the arc to the workpiece 6 and back to the welding source 1 by means of a connection 8. The wire 5 is driven by drive rollers 9 which are coupled to a motor 10 whose speed is maintained constant by a power supply and control device 11 which is also adjustable. Depending on the workpiece, the material, horizontal or vertical welding, the sort of shielding gas, if any, which may be fed in simultaneously with the welding wire, and the welding process to be used, the wire feed rate and the welding source 1 are adapted to each other by means of the device 11. This adjustment depends on the skill of the operator or is previously determined by means of a program device which combines certain feed rates with certain open-circuit welding voltages. The welding source 1 and the control device 11 are supplied from a supply line 2.

Figure 2:
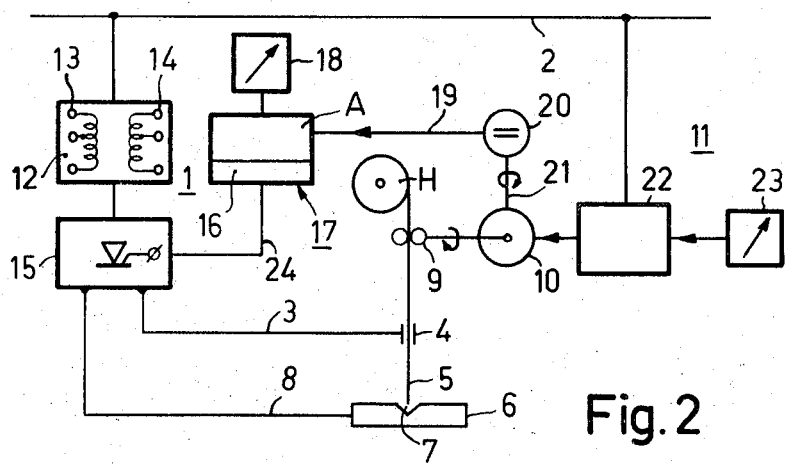
FIG. 2 shows a block diagram of the welding apparatus according to the invention.

FIG. 2 shows a welding device in which the invention is used and corresponding sections have the same reference numerals as those in FIG. 1.

The welding source 1 comprises a welding transformer 12 whose primary windings may be provided with taps 13 and whose secondary windings may be provided with taps 14. The transformer may be of the single-phase or the multi-phase type. The block 15 represents a thyristor rectifier, to which a control line 24 is connected which supplies a signal to each thyristor to fire it at the correct instant. This control signal is variable in time so that in conjunction with the phase or phases of the alternating current supply 2, a greater or smaller portion of the secondary voltage of the welding transformer 12 is transferred to the supply lines 3 and 8, thus enabling the welding voltage to be adjusted. The Figure does not show any chokes which may be included in the primary or secondary welding circuit. The wire feed device 9, 10, 11 comprises a wire feed rate meter constituted by a tachogenerator 20 which is coupled to the shaft of the motor 10 via a coupling 21. The voltage, which is supplied by the tachogenerator in proportion to the motor speed, is applied via a connection 19 to a control unit 17, 18 whose section 17 comprises a variable amplifier A and a thyristor control unit 16. The variable amplifier A can be adjusted by means of control element 18. The output signals of the control unit 17, 18 are applied via the connection 24 to the control electrodes of the thyristors in the block 15. Adjusting the welding apparatus in accordance with the desired welding conditions is substantially effected by a device 23, which comprises controls by means of which the motor speed can be adjusted. It is common practice to use variable transformers and potentiometers for this purpose, if necessary, in conjunction with thyristor motor controls or tapped resistors and tapped transformers, as indicated by box 22. Potentiometers, for example, can easily be installed at a remote location or remote-controlled with or without the aid of a drive motor.

The controls 18 may also be remote-controlled and are provided to obtain a special control characteristic or to provide a continuous fine control of the welding voltage during welding to obtain, for example immediate adaptation to varying conditions.

Figure 3:
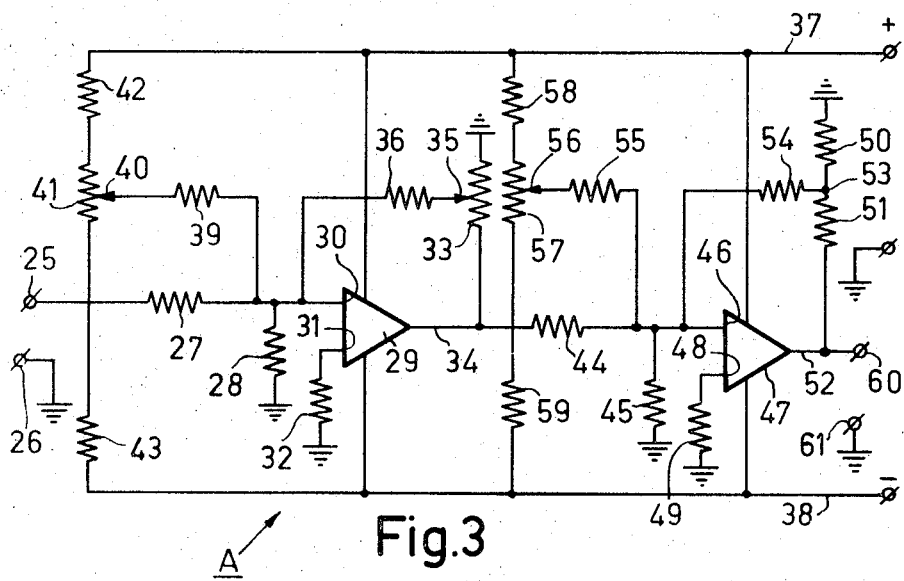
FIG. 3 shows the amplifier of the control unit.

FIG. 3 shows the circuit diagram of the amplifier of the control unit 17, 18. The input terminals 25 and 26 are connected to the tacho-generator 20 via the connection 19 of FIG. 2.

The tacho-voltage on these terminals is converted into a current by the resistor 27 and produces a voltage across the resistor 28. This voltage is applied to the input terminal 30 of the amplifier 29, whose other input terminal 31 is connected to ground and thus to the terminal 26 via a balancing resistor 32. The gain factor of the amplifier 29 is adjustable by means of a potentiometer 33, which is included between the output terminal 34 and ground.

The negative feedback voltage is taken from the wiper 35 and applied to the input terminal 30 via the resistor 36. The amplifier 29 is supplied from a line 37 connected to a voltage source which is positive relative to ground, and from a line 38 connected to a negative voltage source.

Moreover, it is possible to apply to the terminal 30 a bias voltage produced across the resistor 28 by a current defined by a series resistor 39 and an adjustable voltage taken from the wiper 40 of a potentiometer 41. The potentiometer via a series resistor 42 to the line 37 and via a series resistor 43 to the line 38, thus using the supply voltages as a reference voltage.

The output voltage obtained on the terminal 34 is converted into a current by a resistor 44 which produces a voltage across a resistor 45, which voltage is also present on input terminal 46 of an amplifier 47. The amplifier 47 has an input terminal 48 which is connected to ground via a balancing resistor 49. The gain factor is defined by the divider 50, 51 connected between the output terminal 52 and ground. The negative feedback voltage obtained at the junction 53 is also applied to the input terminal 46 via a resistor 54. It is possible to apply a bias signal to the input terminal 46 which is obtained by means of a current, which inter alia is defined by the resistor 55 and which produces a voltage drop across the resistor 45. Said current is proportional to a bias voltage and is obtained from the wiper 56 of a control element 57 constituted by a potentiometer, which is supplied via a series resistor 58 from line 37 and via a series resistor 59 from line 38. The control signal obtained on the output terminal 52 is fed to an output terminal 60, which with the output terminal 61, connected to ground, is connected to the control input of the thyristor control unit. This control unit converts the control signal into a suitable control signal for the thyristors in the welding circuit so as to cause the thyristors to conduct or extinguish, as appropriate.

In accordance with this process a certain welding voltage is obtained which is usually referred to as the opencircuit welding voltage, i.e., the no-load voltage on the welding source terminals.

Figure 4:
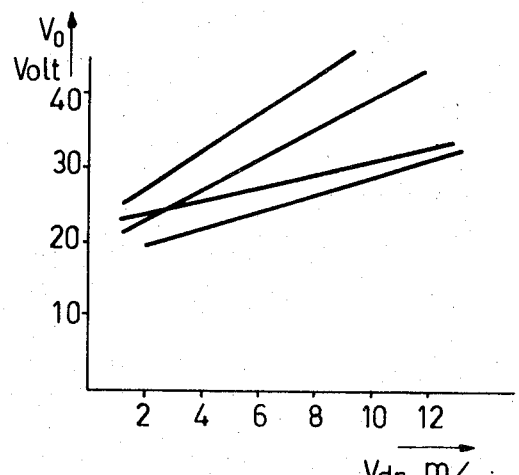
FIG. 4 shows a graph of the open circuit welding-voltage versus the welding-wire feed-rate.

In FIG. 4 the open-circuit welding voltage $V_o$ is plotted vertically versus the wire feed rate $V_{dr}$, in meters per minute, plotted in the horizontal direction. The graph shows four lines which represent a certain relationship between the open-circuit welding voltage and the wire-feed rate and which depend on the required welding conditions already specified in the introduction.

Figure 5:
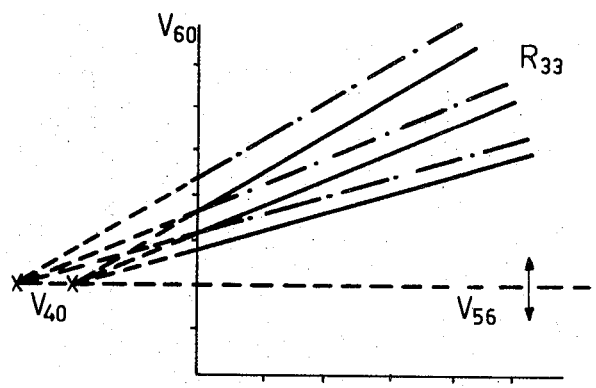
FIG. 5 shows a graph of the output voltage versus the input voltage of the amplifier according to FIG. 3.

FIG. 5 gives the relationship between the voltage on the terminal 60, $V_{60}$, of the amplifier A of FIG. 3 and the tacho-voltage $V_t$ on the terminal 25. Assuming that the open-circuit welding voltage has a linear relationship with the voltage $V_{60}$ and that the wire feed rate $V_{dr}$ is proportional to the tacho-voltage $V_t$, it is evident from FIG. 5 that the lines of FIG. 4 can be obtained with at least 2, or rather 3 parameters. With the voltage $V_{40}$, obtained from the potentiometer 41 in FIG. 3, a line of the graph can be shifted parallel to itself. This can also be achieved by means of the voltage $V_{56}$ on the potentiometer 57. Potentiometer $R_{33}$ varies the gain factor and thus the slope of the lines. The graph also reveals that changing $R_{33}$ by selection of $V_{40}$ yields a series of lines which further converge or diverge.

Figure 6:
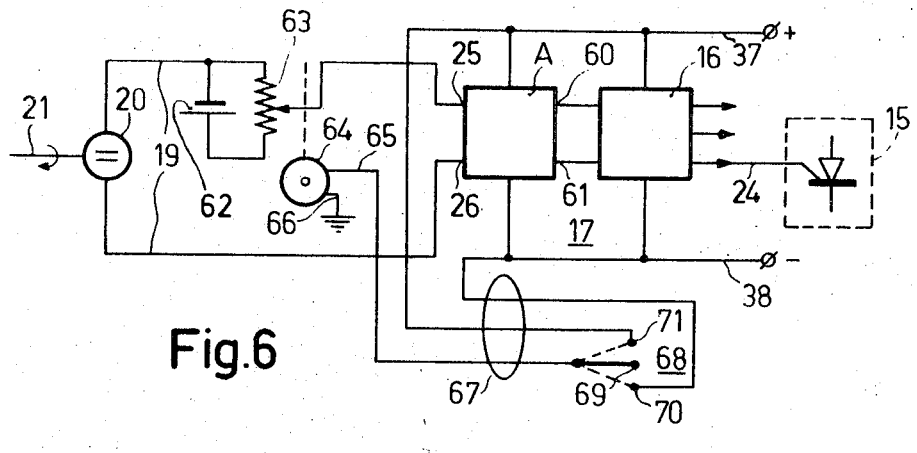
FIG. 6 shows a remote control with a three-position switch.

FIG. 6 shows an embodiment of the components 21, 20, 19, 17, 18, 24 and 15 of FIG. 2. In those cases in which the amplifier of FIG. 3 has a fixed bias, adapted to a specific welding application, and in which it is objectionable to remote-control one of the control potentiometers 41, 33 or 57, the circuit arrangement of FIG. 6 provides a solution to enable the operator to change the welding voltage during welding while maintaining the control according to the invention. The effect, which is obtained is the same as that of the voltage $V_{40}$ in FIG. 5. In the connection 19 from the tachogenerator 20 to the unit 17 a variable voltage source is included in series. For this purpose, a reference source 62, for example a 1.5 volt battery, is connected to a potentiometer 63. One end of the interruption in one of the lines 19 is connected to the battery and the other end to the wiper of the potentiometer 63. A drive motor 64 can move the wiper along the potentiometer via a transmission so that a variable voltage in series with the tacho-voltage is obtained. The motor 64 may, for example, rotate counterclockwise when applying a voltage of a given polarity and clockwise when the polarity is reversed. The positive voltage source connected to line 37 and the negative voltage source connected to line 38 are taken as an example. These sources may be connected via a three-position switch 68 to the connection terminal 65 of the motor 64, whose terminal 66 is connected to ground. A three-core connection 67 to the three position switch 68 is provided for remote control. Said switch may, for example, be mounted on the welding torch. At rest, the switch is in the neutral position, denoted by 69. The operator can now set the switch to position 70 with the same hand with which he holds the welding torch, whereupon the line 38 is connected to the terminal 65 of the motor so that the motor will rotate, for example, counter-clockwise. By setting the switch to position 71, the line 37 is connected to the terminal 65 so that the motor will rotate clockwise. The operator holds the switch in the selected position until the weld reveals that adaptation to the changed conditions, such as thinner or thicker material, end of weld, etc., has been achieved.

What is claimed is:

1. A consumable electrode electric arc welding apparatus comprising, an adjustable welding voltage source with electronically controlled control devices connected in a welding current circuit that includes a workpiece and a consumable wire electrode, a wire electrode feed device including a motor driving the consumable wire electrode and provided with a wire feed rate meter, a program device coupled to said wire feed device for adjusting the welding source and the wire feed rate, wherein the improvement comprises a control unit having output terminals connected to a control input of the electronically controlled control devices and a first input connected to the output of the wire feed rate meter for controlling the control devices in accordance with the wire feed rate, the control unit comprising control elements for obtaining a desired relationship between wire-feed rate and welding source voltage, and said program device includes controls which are connected to the wire feed device for adjusting the wire feed rate.

2. A welding apparatus as claimed in claim 1, wherein the control unit comprises an amplifier one input of which is connected to the first input of the control unit and which amplifier is provided with at least one input connected to a control element for adjusting a bias signal for the amplifier, said amplifier including connection terminals to which a gain control element is connected for adjusting the gain factor of the amplifier, means connecting the amplifier output to a control input of a control device incorporated in the control unit.

3. A welding apparatus as claimed in claim 2, characterized in that the control elements are potentiometers with the ends of each of the potentiometers for the bias signal being connected to a reference voltage and the control signal being taken from the wiper of the potentiometer and one end.

4. A welding apparatus as claimed in claim 3, in which a welding torch is connected to the wire feed device and receives a consumable welding wire, and the adjustable welding source is connected to a work-piece to be welded and to the welding torch, and the welding torch is provided with a control switch, characterized in that the wiper of one of the potentiometers can be moved by means of a reversible drive motor connected to the control switch, said switch having at least three positions one of which being neutral and two being connected to a voltage source so that the drive motor rotates in one direction or the other direction respectively.

5. A consumable electrode electric arc welding system comprising, means including a motor for feeding a consumable wire electrode towards a workpiece, means for deriving a wire feed signal proportional to the wire electrode feed rate, an adjustable source of welding voltage including a current control device connected in circuit to control the flow of weld current between the wire electrode and the workpiece, a program device coupled to said wire feed means and including means for adjusting the wire feed rate, wherein the improvement comprises a control unit having an input connected to receive said wire feed signal and an output coupled to a control electrode of said current control device for controlling the conduction thereof as a function of the wire feed signal, said control unit including one or more control elements for adjusting the control unit to provide a given relationship between the wire feed rate and the welding voltage.

6. A welding system as claimed in claim 5 wherein said control unit includes variable gain amplifier means for deriving a generally linear characteristic between an input signal applied thereto and its output signal, and said control elements include a first element for adjusting the slope of said amplifier characteristic and a second element for effectively shifting the amplifier characteristic parallel to itself.

7. A welding system as claimed in claim 6 wherein said amplifier means comprises a variable gain amplifier and said first control element is connected in circuit therewith to vary its gain factor and the second control element is connected in circuit therewith to vary the amplifier bias voltage.

8. A welding system as claimed in claim 7 wherein said amplifier comprises an operational amplifier having a negative feedback loop and said first control element is included within the negative feedback loop.

9. A welding system as claimed in claim 6 wherein said amplifier means includes first and second amplifiers connected in cascade and said first control element is connected in circuit to vary the gain factor of one of said amplifiers and the second control element is connected in circuit to vary the bias voltage of at least one of said amplifiers 10. A welding system as claimed in claim 5 further comprising a remote control unit for further adjusting the welding voltage as a function of said wire feed signal comprising, a further control element connected between the output of said wire feed signal deriving means and the input of the control unit, a reversible motor connected to a control input of said further control element, and a control switch connected in circuit with the motor and a source of motor supply voltage to control the direction of motor rotation.

* * * * *

PO-1050
(5/69)

UNITED STATES PATENT OFFICE
CERTIFICATE OF CORRECTION

Patent No. 3,851,137      Dated November 26, 1974

Inventor(s) JOHANNES GERARDUS VERHAGEN ET AL

It is certified that error appears in the above-identified patent and that said Letters Patent are hereby corrected as shown below:

IN THE TITLE PAGE change "Edmond Joannes Josef Dekeyser" to -- Edmond Joannes Josef De Keyser --;

Signed and Sealed this seventh Day of October 1975

[SEAL]

Attest:

RUTH C. MASON
*Attesting Officer*

C. MARSHALL DANN
*Commissioner of Patents and Trademarks*